Figure 4:
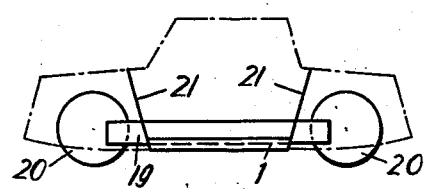

Jan. 14, 1958     K. WILFERT ET AL     2,819,925
MOTOR VEHICLE WITH LIGHT METAL FLOOR PORTION
Filed Aug. 6, 1953     2 Sheets-Sheet 1

INVENTORS
KARL WILFERT &
BÉLA BARÉNYI.

BY *Dicke and Craig*

ATTORNEYS.

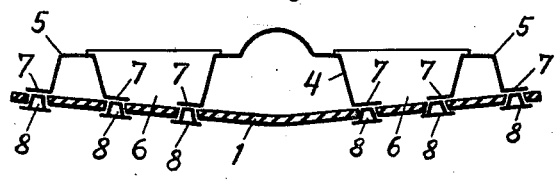
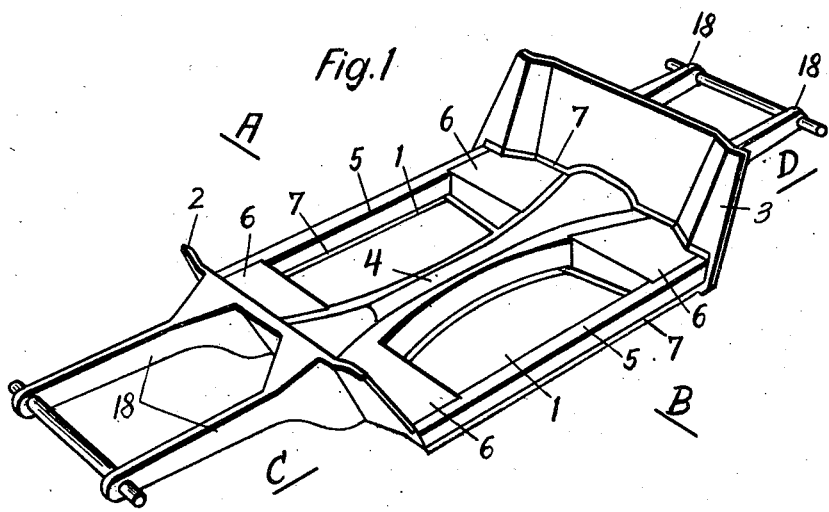
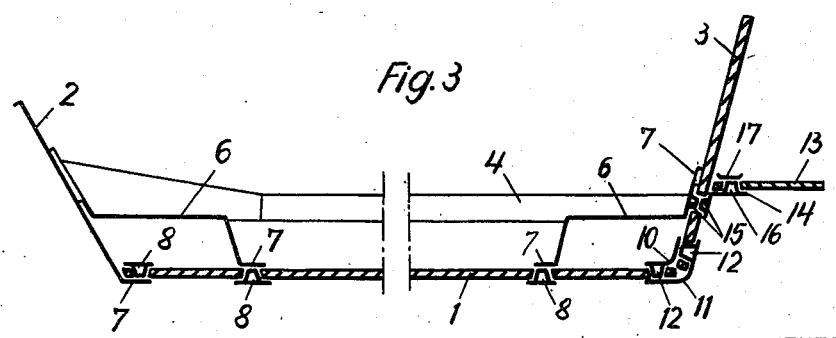

United States Patent Office 2,819,925
Patented Jan. 14, 1958

2,819,925

MOTOR VEHICLE WITH LIGHT METAL FLOOR PORTION

Karl Wilfert, Stuttgart-Degerloch, and Béla Barényi, Stuttgart-Rohr, Germany, assignors to Daimler-Benz Aktiengesellschaft, Stuttgart-Unterturkheim, Germany Application August 6, 1953, Serial No. 372,736

Claims priority, application Germany August 8, 1952

4 Claims. (Cl. 296—28)

The present invention deals with a motor vehicle, particularly with passenger cars whose supporting or non-supporting wall parts are entirely or partially made of light sheet metal.

It is an object of the present invention to reduce the weight of motor car chassis.

Another object of the present invention is to reduce the troublesome running noises occurring in motor cars.

According to the present invention, first of all, the wall parts embodying the floor and the panels defining the passenger room may consist of light metal, particularly of light sheet metal. These wall parts may be of any shape and, for instance, consist of plane, curved or spherically-shaped plates. These light metal wall parts may be solidly or detachably connected with each other and/or with parts of chassis, with the frame or with wall parts, for instance, made of metal of a higher strength than that of the light metal, and there the light metal wall parts may be strengthened, if so desired, by members made of metal of a higher strength. Such a strengthening may be provided, especially when the wall parts, which, according to the present invention, consist of light metal, are designed to be load supporting, as is the case with self-contained bodies. The solid connection of the light metal wall parts with one another and/or with members made of metal of higher strength than that of the light metal wall parts may be established by means of rivets, or by put-on strips made of sheet steel. With these put-on strips the connection may advantageously be established by a strip being provided on either side of the light sheet metal, and protuberances or projections of the put-on strips extend through the light sheet metal so that the protuberances of the one put-on strip lie close to the other put-on strip whereby they can be welded together. On one side of the connection, instead of the put-on strip, single cuplike members may be inserted in holes provided in the light sheet metal, the edges of the cuplike members of sheet steel projecting beyond the light sheet metal and being welded to the put-on strip arranged on the other side of the light sheet metal. The connection of two members with the put-on strips according to the present invention may also advantageously be applied to other fields of technics and to other materials, to plastics, for instance.

A particularly suitable example of construction according to the object of the invention may be so designed that the floor of the passenger room consists of a light metal plate with longitudinal and cross members made, for instance, of sheet steel mounted on it.

Further objects, features and advantages of the present invention will become more obvious from the following description when taken in connection with the accompanying drawing which shows, for purposes of illustration only, several embodiments of construction according to the present invention, and wherein:

Fig. 1 is a perspective view of a chassis frame with floor and separating panels of the passenger room in accordance with the present invention, Fig. 2 is a cross section along the line A—B in Fig. 1,
Fig. 3 is a longitudinal section along the line C—D in Fig. 1, Figs. 4, 5, 6, 7, 8 and 9 illustrate three embodiments of chassis constructions each in a side view and in a top view.

Referring now to the drawings wherein like reference numerals are used throughout to designate like parts, and more particularly to Figures 1, 2 and 3, reference numeral 1 designates a sheet metal floor panel 1 slightly curved slightly transversely to the longitudinal direction of the body. At the front end of this floor panel 1 a border panel 2 made of sheet steel, for instance, and at the rear end a border panel 3 of light sheet metal is solidly attached to the floor panel 1. On the floor panel 1 a central longitudinal girder 4 of a tubular or box section and made of sheet steel is mounted, and on either longitudinal edge of the floor panel a longitudinal girder 5 is provided. Within the angle formed by the panel floor 1 and the border panel 2, and the border panel 3, respectively, cross members 6 of an angular cross section and made of sheet steel are inserted and welded to the longitudinal girders 4, 5.

As will be seen in Figures 2 and 3, the structural parts 2, 4, 5 and 6 made of sheet steel are solidly connected with the light metal panel 1 in such a way that each of them is put on the floor panel 1 with an angularly bent put-on strip 7. In the panel 1 there are rows of holes provided in the range of the put-on strips 7, and into the holes cuplike members 8 also made of sheet steel are inserted from the side opposite to the put-on strip 7. In that case the height of the cuplike members 8 is so dimensioned that, on the one hand, they are tightly put on the floor panel 1 with their edges, and, on the other hand, welded to the put-on strip 7 with their bottoms. These cuplike members 8 can singly be inserted into the holes of the floor panel 1 or also be connected with each other by means of webs so as to form striplike members. The floor panel 1 is connected with the border panel 3 by means of two angular or curved put-on strips 10 and 11 being provided with protuberances 12 which extend through holes in the panels 1 and 3 and are welded together. These protuberances 12 may be arranged at the ends of the put-on strips 10 and 11 lying opposite to each other. This connection, by way of example, may also be designed so that either row of protuberances 12 is arranged on one of the put-on strips 10 and 11, the other put-on strip having no protuberances.

Behind the border panel 3 a luggage room floor 13 may be provided, which is also made of light sheet metal. It is connected with the border panel 3 by means of an angular put-on strip 14 in such a way that the one leg of this put-on strip 14 lies on the border panel 3, the protuberances 15 of the leg half penetrating the border panel 3. These protuberances contact protuberances 15 of a put-on strip arranged at the cross member 6 in the middle of the wall thickness and are welded to them. The protuberances 16 of the other leg of the put-on strip 14 extend through the luggage room floor 13, and a put-on strip 17 arranged on the opposite side is welded to the bottoms of the protuberances 16.

At each of the two border panels 2 and 3, two longitudinal members 18 are attached in an appropriate way.

Figure 5:
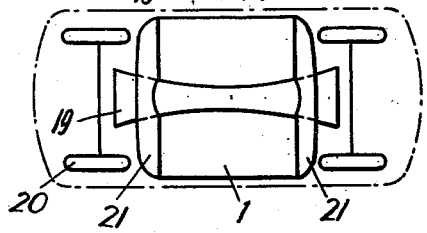

In the example of construction according to the present invention illustrated in Figs. 4 and 5 the chassis of the motor vehicle comprises a middle pipe or tubular frame 19 with the road wheels 20. To the frame 19, by way of example, there is on the lower side attached the floor panel 1, which together with the front and rear walls 21 defines the passenger room within the body. It is suitable to form these walls 21 plain.

Figure 6:
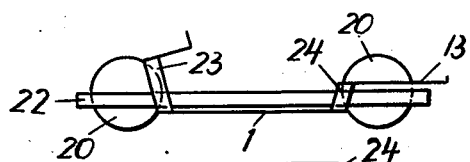
Figure 7:
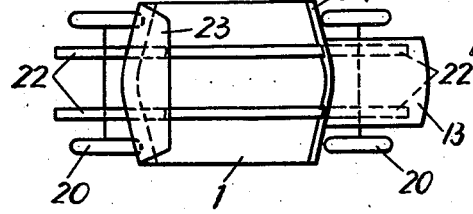

In the chassis according to Figs. 6 and 7 the frame consists of side frames 22 carrying, for example, a plain panel 1. The passenger room is in the front thereof defined by a specially designed front wall 23, and, the luggage room floor 13 is arranged at the rear wall 24. Both the front and the rear walls 23 and 24 are slightly curved outwardly.

Figure 8:
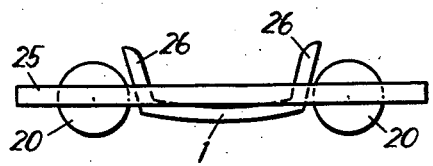
Figure 9:
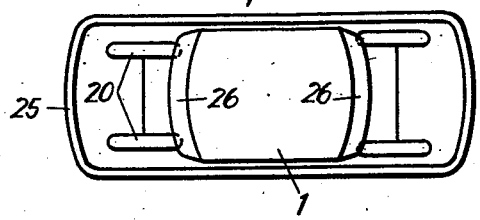

The chassis illustrated in Figs. 8 and 9 has an external frame 25, into which a spherically shaped floor panel 1 is inserted. This floor panel is connected with two walls 26 curved outwardly, and spherically shaped, when necessary.

In all the three examples of construction of the chassis according to the present invention the floor panel 1 of the passenger room and, when necessary, the separating walls 21, 23, 24 and 26 as well as the luggage room floor 13 consist of light sheet metal and are connected with each other and with the chassis frames 19, 22 and 25 in the above described way.

What is claimed is:

1. In a motor vehicle having a floor portion comprising light-metal parts including a floor plate and at least one transverse wall thereof, and means for fastening said floor plate and said transverse wall with each other and with the other parts of said floor portion including apertures provided in said light-metal parts and put-on strips with cup-like insertion members formed of sheet steel extending at least partially through said apertures, and further sheet steel members for attachment with said cup-like members to secure together said light-metal parts.

2. In a motor vehicle having a floor portion comprising light-metal parts including a floor plate and at least one transverse wall thereof, and means for fastening said floor plate and said transverse wall with each other and with the other parts of said floor portion including apertures provided in said light-metal parts and put-on strips with cup-like insertion members formed of sheet steel extending at least partially through said apertures, and further sheet steel members for attachment with said cup-like members to secure together said light-metal parts, and wherein said put-on strips formed of sheet steel have at least twice the width of said cup-like members.

3. In a motor vehicle having a floor portion comprising light-metal parts including a floor plate and at least one transverse wall thereof, and means for fastening said floor plate and said transverse wall with each other and with the other parts of said floor portion including apertures provided in said light-metal parts and put-on strips with cup-like insertion members formed of sheet steel extending at least partially through said apertures, further sheet steel members for attachment with said cup-like members to secure together said light-metal parts, wherein said put-on strips formed of sheet steel have at least twice the width of said cup-like members, and wherein said put-on strips of said insertion members are bent angularly, and wherein said put-on strips are used in pairs to connect together two light-metal parts of said floor portion forming a corresponding angle with each other.

4. In a motor vehicle having a floor portion comprising light-metal parts including a floor plate and at least one transverse wall thereof, and means for fastening said floor plate and said transverse wall with each other and with the other parts of said floor portion including apertures provided in said light-metal parts and put-on strips with cup-like insertion members formed of sheet steel extending at least partially through said apertures, and further sheet steel members for attachment with said cup-like members to secure together said light-metal parts, wherein said put-on strips of said insertion members are bent angularly, and wherein said put-on strips are used in pairs to connect together two light-metal parts of said floor portion forming a corresponding angle with each other.

References Cited in the file of this patent

UNITED STATES PATENTS

| | | |
|---|---|---|
| 1,666,814 | England | Apr. 17, 1928 |
| 2,191,632 | Smith | Feb. 27, 1940 |
| 2,192,075 | Gregoire | Feb. 27, 1940 |
| 2,242,269 | Siebler | May 20, 1941 |
| 2,319,455 | Hardman et al. | May 18, 1943 |
| 2,471,917 | Wilson | May 31, 1949 |
| 2,600,140 | Torseth | June 10, 1952 |
| 2,710,222 | Barenyi | June 7, 1955 |

FOREIGN PATENTS

| | | |
|---|---|---|
| 857,637 | France | Apr. 22, 1940 |
| 626,345 | Germany | Feb. 24, 1936 |